US007448032B2

(12) United States Patent
Bourbonnais

(10) Patent No.: US 7,448,032 B2
(45) Date of Patent: Nov. 4, 2008

(54) METHOD AND APPARATUS FOR INTEGRATION OF URL INTO STANDARD FILE SYSTEMS

(75) Inventor: Roch Bourbonnais, St. Jean (FR)

(73) Assignee: Sun Microsystems, Inc., Santa Clara, CA (US)

( * ) Notice: Subject to any disclaimer, the term of this patent is extended or adjusted under 35 U.S.C. 154(b) by 904 days.

(21) Appl. No.: 10/155,406

(22) Filed: May 22, 2002

(65) Prior Publication Data

US 2003/0220924 A1      Nov. 27, 2003

(51) Int. Cl.
    *G06F 9/44*      (2006.01)
(52) U.S. Cl. ...................................... 717/173; 709/218
(58) Field of Classification Search ................ 717/100, 717/120, 168–178, 218; 709/203, 217, 219, 709/173
    See application file for complete search history.

(56) References Cited

U.S. PATENT DOCUMENTS

| 5,778,231 | A | * | 7/1998 | van Hoff et al. | ............ 717/143 |
| 5,793,966 | A | * | 8/1998 | Amstein et al. | ............ 709/203 |
| 5,918,010 | A | * | 6/1999 | Appleman et al. | .......... 709/203 |
| 5,944,783 | A | * | 8/1999 | Nieten | ......................... 709/202 |
| 6,012,083 | A | * | 1/2000 | Savitzky et al. | ............ 709/202 |
| 6,029,175 | A | * | 2/2000 | Chow et al. | .............. 707/104.1 |
| 6,037,934 | A | * | 3/2000 | Himmel et al. | ............. 715/760 |
| 6,041,360 | A | * | 3/2000 | Himmel et al. | ............. 709/245 |
| 6,088,803 | A | * | 7/2000 | Tso et al. | ....................... 726/22 |
| 6,119,153 | A | * | 9/2000 | Dujari et al. | ................. 709/218 |
| 6,145,003 | A | * | 11/2000 | Sanu et al. | .................... 709/225 |
| 6,202,207 | B1 | * | 3/2001 | Donohue | ..................... 717/173 |
| 6,279,030 | B1 | * | 8/2001 | Britton et al. | ............... 709/203 |
| 6,282,709 | B1 | * | 8/2001 | Reha et al. | ................... 717/175 |
| 6,336,132 | B2 | * | 1/2002 | Appleman et al. | .......... 709/203 |
| 6,381,742 | B2 | * | 4/2002 | Forbes et al. | ................. 717/176 |
| 6,401,118 | B1 | * | 6/2002 | Thomas | ....................... 709/224 |
| 6,789,204 | B2 | * | 9/2004 | Abdelnur et al. | ............ 713/201 |

(Continued)

OTHER PUBLICATIONS

WebOS: Operating System Services For Wide Area Applications: by A. Vahdat, T. Anderson, M. Dahlin, E. Belani, D. Culler, P. Eastham and C. Yoshikawa http://now.cs.berkeley.edu/Webos; pp. 1-12.

(Continued)

*Primary Examiner*—Wei Y. Zhen
*Assistant Examiner*—Phillip H Nguyen
(74) *Attorney, Agent, or Firm*—Meyertons Hood Kivlin Kowert & Goetzel, P.C.

(57) ABSTRACT

Embodiments of the present invention are directed to a method and apparatus for integration of URL's into standard file systems of a local computer. In one embodiment of the present invention, the file system (e.g., a Uniform File System (UFS)) of a local computer is integrated with an Internet protocol, such as the Hyper Text Transport Protocol (HTTP). Once the protocol has been integrated into the file system of the local computer, applications running on local computer can access any Web based documents under that protocol. Thus, the local applications (and/or users) can access these Web based documents (and/or files) as if they are local files even though the documents are actually located on the Internet (and away from the local computer). In a further embodiment, the applications (and/or users) are able to access these Web based documents by utilizing a relating apparatus that relates the applications (and/or users) to their corresponding Web based documents.

11 Claims, 14 Drawing Sheets

U.S. PATENT DOCUMENTS

| | | | | |
|---|---|---|---|---|
| 6,802,061 | B1* | 10/2004 | Parthasarathy et al. | 717/173 |
| 6,857,012 | B2* | 2/2005 | Sim et al. | 709/222 |
| 6,880,129 | B1* | 4/2005 | Lee et al. | 715/763 |
| 6,986,133 | B2* | 1/2006 | O'Brien et al. | 717/173 |
| 6,990,660 | B2* | 1/2006 | Moshir et al. | 717/171 |
| 7,058,696 | B1* | 6/2006 | Phillips et al. | 709/217 |
| 7,111,231 | B1* | 9/2006 | Huck et al. | 715/513 |

OTHER PUBLICATIONS searchWin2000.com Definitions—powered by whatis.com, Network File System, http://searchwin2000.techtarget.com/sDefinition/0,,sid1_gci214121,00.html, Last updated on Jul. 27, 2001.

searchNetworking.com Definitions—powered by whatis.com, WebNFS, http://searchnetworking.techtarget.com/sDefinition/0,,sid7_gci213350,00.html, Last updated on: Apr. 10, 2003.

Sun Microsystems, Inc, WebNFS Client-SDK for Java Software Datasheet, http://www.sun.com/software/webnfs/, Copyright 1994-2006 Sun Microsystems, Inc.

The RFC Archive—RFC 2054, http://www.rfc-archive.org/getrfc.php?rfc=2054, WebNFS Client Specification, B. Callaghan, Sun Microsystems, Inc., Oct. 1996, RFC-2054 © The Internet Society (ISOC) / © 2003-2006 The RFC Archive.

Talks @ Connectathon '97, Conference Date—Wednesday Mar. 5, Slideshow, WebNFS The Filesystem for the Internet, NFS Version 4—Brent Callaghan, Mike Eisler (Sunsoft), http://www.connectathon.org/talks97/brent1.pdf.

http://www.ietf.org/rfc/rfc2616.txt, R. Fielding (UC Irvine), J. Gettys (Compaq/W3C), J. Mogul (Compaq), H. Frystyk (W3C/MIT), L. Masinter (Xerox),P. Leach (Microsoft), T. Berners-Lee (W3C/MIT) Hypertext Transfer Protocol, Jun. 1999, Copyright (C) The Internet Society (1999).

* cited by examiner

METHOD AND APPARATUS FOR INTEGRATION OF URL INTO STANDARD FILE SYSTEMS

BACKGROUND OF THE INVENTION

1. Field of the Invention

The present invention relates to the field of computer file processing and, in particular, to a method and apparatus for integrating Uniform Resource Locators (URL's) into standard file systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Solaris and all Java-based trademarks and logos are trademarks or registered trademarks of Sun Microsystems, Inc., in the United States and other countries. All SPARC trademarks are used under license and are trademarks of SPARC International, Inc., in the United States and other countries. Products bearing SPARC trademarks are based upon an architecture developed by Sun Microsystems, Inc.

2. Background Art

To access files on the Internet, currently one needs the aid of a browser software to navigate from one file to another. The browser is able to navigate the Internet by using Uniform (or previously Universal) Resource Locators (URL's) and certain Internet protocols, such as Hyper Text Transport Protocol (HTTP), File Transfer Protocol (FTP) or possibly others to come. URL's are strings that specify the location of files on the Internet. URL's can appear in a browser's bookmarks or they can be quoted from messages or documents viewed by the browser. Shown below are examples of a HTTP URL and a FTP URL:

http://machine/path1/path2/document.ext ftp://machine/path1/path2/document2.ext

There are times when a file on the Internet needs to be accessed by an application stored on the local computer without the necessity to download such file into the local computer. For example, there may not be enough persistent storage space (e.g., space in a disk drive, a memory stick, a tape drive, etc.) in the local computer to download all the needed files. Currently, the use of the browser as an intermediary is necessary before the application on the local computer is able to access the file on the Internet.

The use of the browser as an intermediary has certain disadvantages. For example, before the browser can properly function as an intermediary, it must be configured to recognize the common extension on the file and associate some applications to it (for example the browser needs to recognize .pdf is associated with an acroread application). However, certain extensions on the file cannot be configured to be recognized by the browser and certain applications stored on the browser cannot be configured onto the browser.

Accordingly, it would be advantageous and desirable to provide a method and system that allows a file on the Internet to be accessed by an application stored on the local computer without the use of the browser as an intermediary and without downloading the file into a persistent storage of the local computer. The persistent storage is referred to here as a storage on the local computer that can be used to permanently store a file into the local computer.

SUMMARY OF THE INVENTION

Embodiments of the present invention are directed to a method and apparatus for integration of Uniform Resource Locators (URL's) into standard file systems of a local computer. In one embodiment of the present invention, the file system (e.g., a Uniform File System (UFS)) of a local computer is integrated with a Web Protocol, such as the Hyper Text Transport Protocol (HTTP), File Transfer Protocol (FTP), etc.

In an embodiment of the present invention, a computer system includes a public network and a Uniform Resource Locator (URL). A local file system is connected with the URL via the public network. The URL is connected with said local file system without using a browser as an intermediary. A standard file system protocol is configured within the local file system. An Internet protocol is encapsulated within said standard file system protocol. The computer system also contains persistent storage for permanently storing downloaded files within the local file system. The URL is treated as a local file in the encapsulated local file system without actually downloading the URL into the persistent storage.

A caching mechanism may also be implemented within the computer system. The caching mechanism allows users on the computer system to access and share cached files in a confidential manner.

In a further embodiment, users (and/or applications within the computer system) are able to access the files on the Internet by utilizing a relating (or connecting) apparatus that relates (or connects) the applications (and/or users) to their corresponding Internet based files.

A more complete understanding of the present invention will be afforded to those skill in the art, as well as a realization of additional advantages and objects thereof, by a consideration of the following detailed description of the embodiment. Reference will be made to the appended sheets of drawings, which will first be described briefly.

BRIEF DESCRIPTION OF THE DRAWINGS

The drawings illustrate the design and utility of embodiments of the invention. The components in the drawings are not necessarily to scale; instead, emphasis is placed upon illustrating the principles underlying the embodiment. Moreover, features, aspects and advantages of the present invention will become better understood with regard to the following description, appended claims and accompanying drawings where:

DETAILED DESCRIPTION OF THE INVENTION

In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiments of the present invention are directed to a method and apparatus for integration of URL's into standard file systems of a local computer. In one embodiment of the present invention, the file system (e.g., a Uniform File System (UFS)) of a local computer is integrated with an Internet protocol, such as the Hyper Text Transport Protocol (HTTP), File Transfer Protocol (FTP), etc. Once the protocol has been integrated into the file system of the local computer, applications running on the local computer can access any Web based documents (or files) under that protocol. Thus, the local applications can access these Web based documents (or files) as if they are local files even though the documents are actually located on the Internet (and away from the local computer).

Multi-Tier Application Architecture

An embodiment of the invention can be implemented within a multi-tier application architecture computer system.

In the multi-tier application architecture, computers can be categorized as two types: servers and clients. Computers that provide data, software and services to other computers are servers; computers that are used to connect users to those data, software and services are clients. In operation, a client communicates, for example, requests to a server for data, software and services, and the server responds to the requests. The server's response may entail communication with a file management system for the storage and retrieval of files.

The multi-tier architecture includes at least a file tier that includes a file server; an application tier that includes an application server and application logic (i.e., software application programs, functions, etc.); and a client tier. The application server responds to application requests received from the client. The application server forwards file requests to the file (or database) server.

Figure 1:
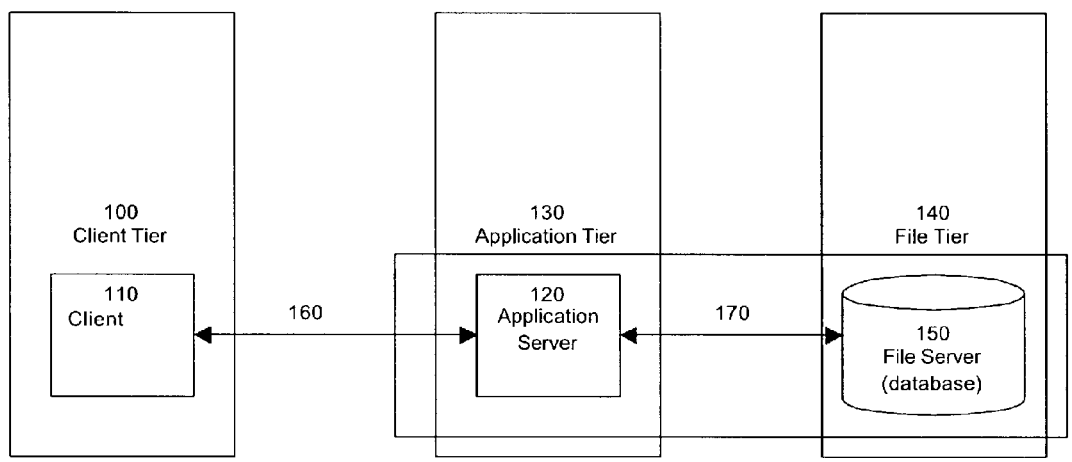
FIG. 1 is a block diagram of a multi-tier architecture.

FIG. 1 provides an overview of a multi-tier architecture. Client tier 100 typically consists of a computer system that provides an interface, such as a Human Interface Device (HID), with a human user. The HID is capable of receiving data and displaying data.

Other functionality may be provided by an application server 120 in application tier 130. The apportionment of functionality between client tier 100 and application tier 130 is dependent upon whether a "thin client" or a "thick client" topology is desired. In a thin client topology, the client tier 100 (i.e., the end user's computer) is used primarily to display output and obtain input while the computing takes place in other tiers. A thick client topology, on the other hand, uses a more conventional, general purpose computer which has processing, memory, and file storage abilities. File (or database) tier 140 contains the data or files accessed by the application logic in application tier 130. File (or database) server 150 manages the file and/or its structure, as well as the operations that can be performed on the file and/or its structure.

Application server 120 can include applications such as a corporation's scheduling, accounting, personnel and payroll applications. Application server 120 manages requests for the applications that are stored therein. Application server 120 can also manage the storage and dissemination of production versions of application logic. File server 150 manages the database(s) that manage files (or data) for applications. For example, file server 150 responds to requests to access the scheduling, accounting, personnel and payroll application files.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods (or software modules) that reside on another computer system. Parameters are packaged and unpackaged for transmittal to and from the client tier. Connection 170 between application server 120 and file server 150 represents the transmission of requests for data and the responses to such requests from applications that reside in application server 120.

Elements of the client tier, the application tier and the file tier (e.g., client 110, application server 120 and file server 150) may execute within a single computer. However, in a typical system, elements of the client tier, the application tier and the file (or database) tier may execute within separate computers interconnected over an internal network such as a LAN (local area network) or WAN (wide area network).

Figure 2:
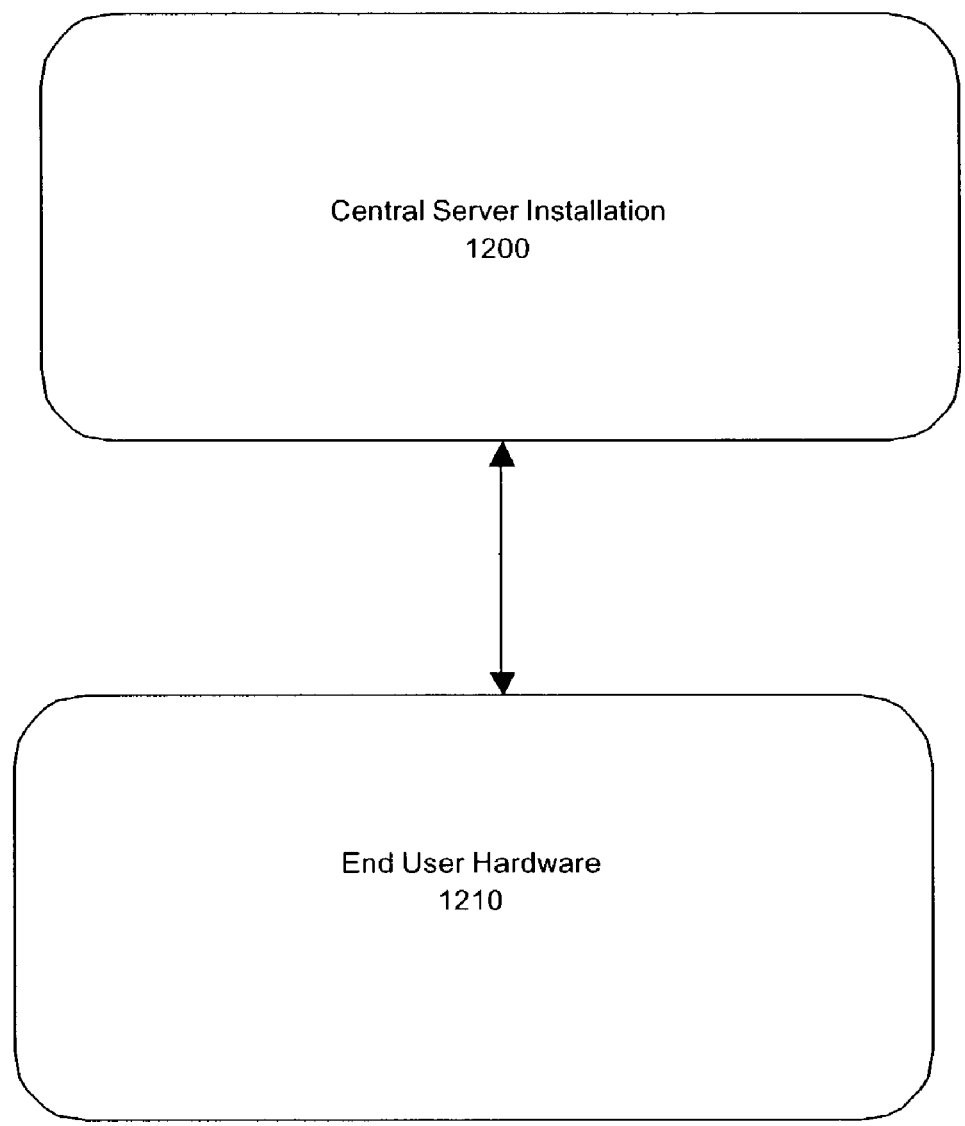
FIG. 2 is a block diagram of an example of a thin client topology called a virtual desktop system architecture in accordance with one embodiment of the present invention.

One embodiment of the invention is used as part of a thin client architecture system. FIG. 2 shows an example of a thin client topology called a virtual desktop system architecture. The virtual desktop system architecture provides a re-partitioning of functionality between a central server installation 1200 and end user client hardware 1210. At the user client end, all functionality is eliminated except that which generates output to the user (e.g., display and speakers) and takes input from the user (e.g., mouse and keyboard) or other peripherals with which the user may interact (e.g., scanners, cameras, removable storage, etc.). The output is provided to a terminal referred to here as a "Human Interface Device" (HID). The HID is capable of receiving and displaying the data. All computing services are done by the central server installation 1200 and the computing services are done independently of the destination of the data being generated.

Figure 3:
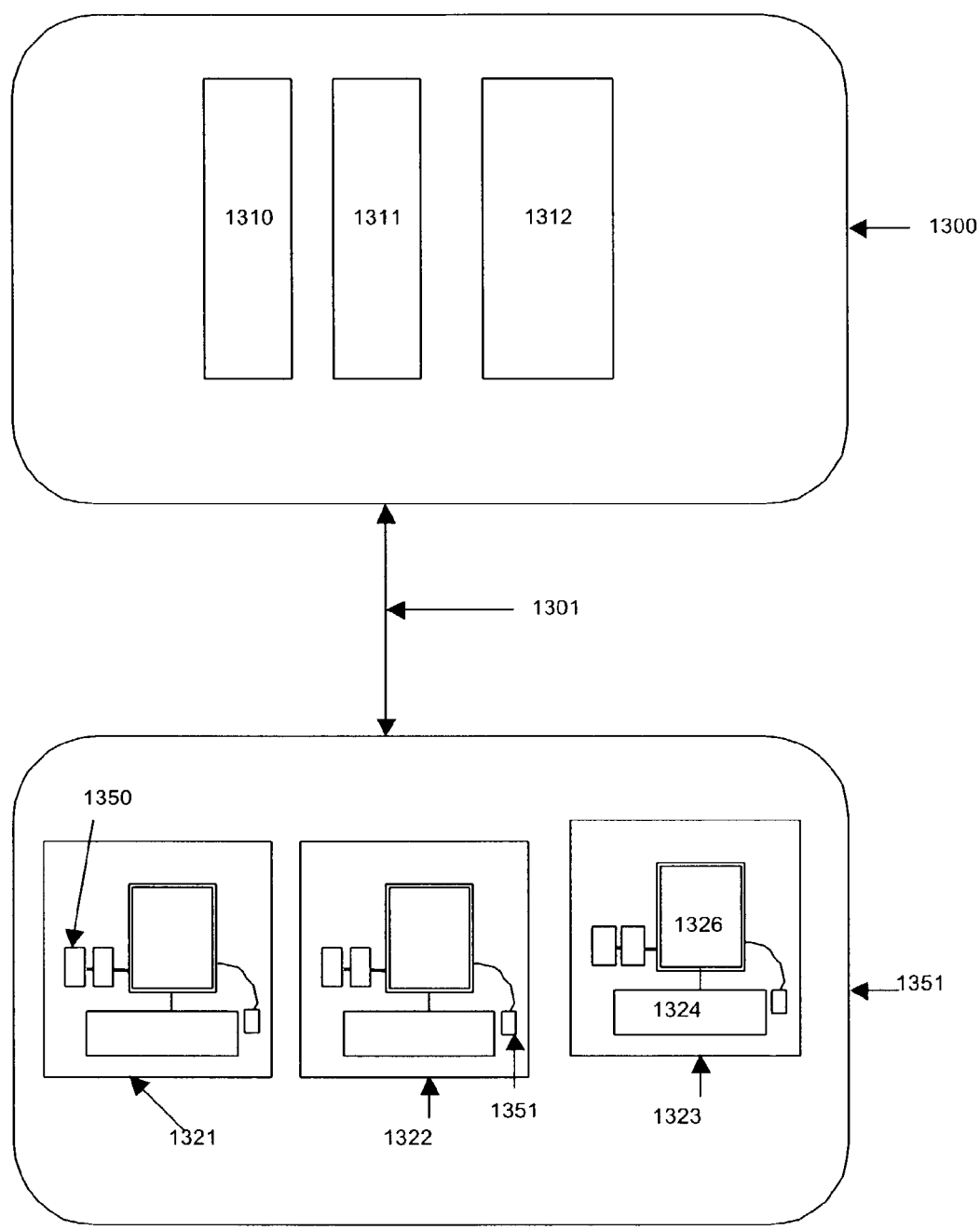
FIG. 3 is a block diagram of a system wherein one or more services communicate with one or more (Human Interface Devices) HID's through a communication link, such as a network in accordance with one embodiment of the present invention.

The computing services are not tied to a specific computer, but may be distributed over one or more traditional desktop systems, such as described in connection with FIG. 3, or with traditional servers. One computer may have one or more services and a service may be implemented by one or more computers. The services are provided to HID's and the services are under the control of a common authority or manager. In FIG. 3, the services are provided by computers 1310, 1311, and 1312.

The computer system (providing the services) can connect directly to the HID's through the interconnect fabric. It is also possible for the service producer to be a proxy for another device providing the computational service, such as a file server computer in a three-tier architecture, where the proxy computer might only generate queries and execute user interface code.

The interconnect fabric can comprise any of multiple, suitable communication paths for carrying data between the services and the HID's. In one embodiment the interconnect fabric is a local area network implemented as an intranet or Ethernet network. Any other local network may also be utilized. The invention also contemplates the use of wide area networks, the Internet, the World Wide Web, and others. The interconnect fabric may be implemented with a physical medium, such as a wire or fiber optic cable, or it may be implemented in a wireless environment.

In general, the Internet is referred to as an unstructured network system that uses Hyper Text Transfer Protocol (HTTP) as its transaction protocol. An internal network, also known as intranet, comprises a network system within an enterprise. The intranet within an enterprise is typically separated from the Internet by a firewall. Basically, a firewall is a barrier to keep destructive services on the public Internet away from the intranet.

The internal network 1301 (e.g., the intranet) provides actively managed, low-latency, high-bandwidth communication between the HID and the services being accessed. One embodiment contemplates a single-level, switched network with cooperative (as opposed to competing) network traffic. Dedicated or shared communication interconnects may be used in the present invention.

The HID is the means by which users access the computational services provided by the services. FIG. 3 illustrates HID's 1321, 1322 and 1323. Each HID comprises a display 1326, a keyboard 1324, a mouse 1351, and audio speakers 1350. The HID includes the electronics needed to interface these devices to the internal network 1301 and to transmit to and receive data from the services.

Figure 4:
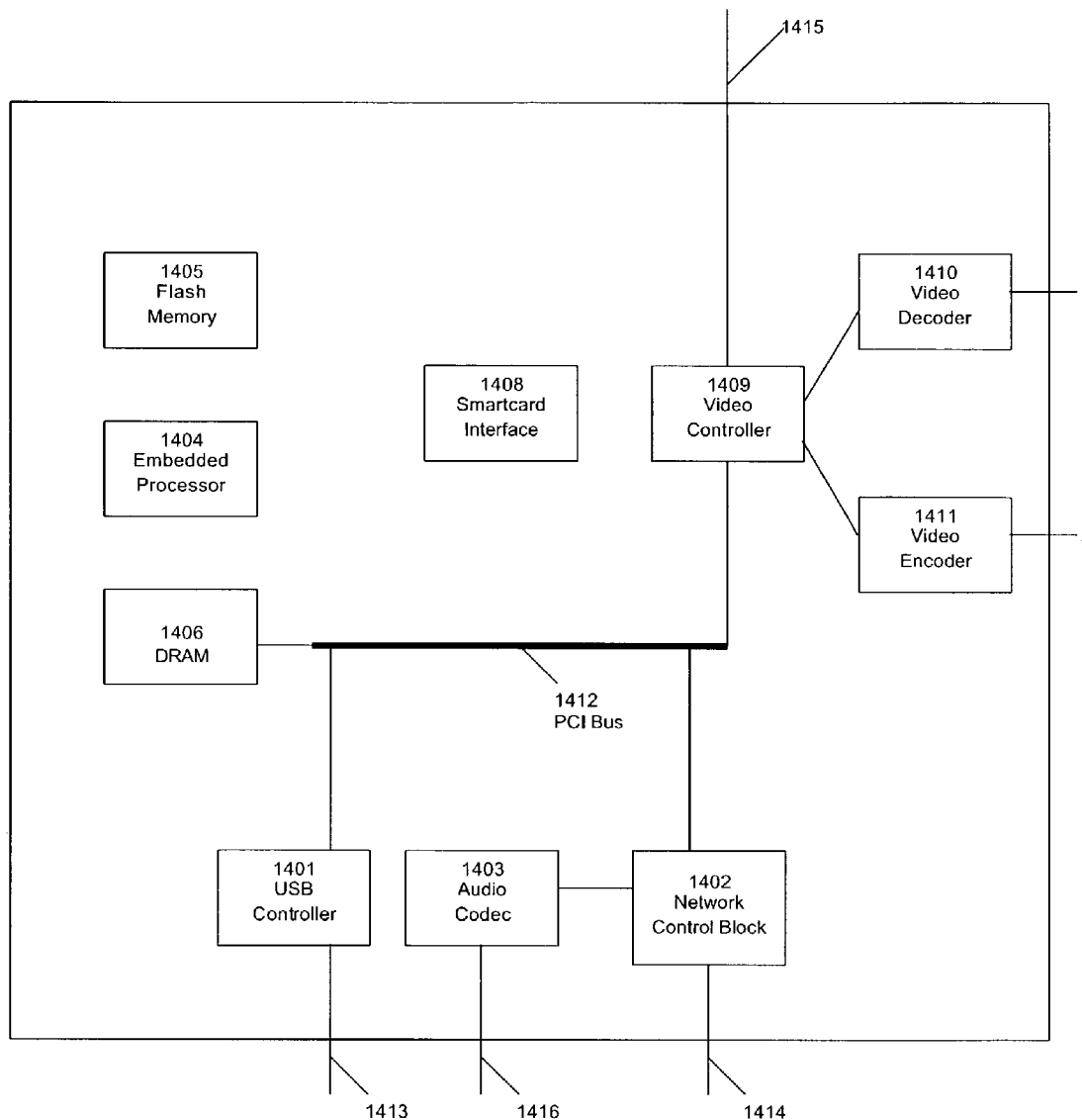
FIG. 4 is a block diagram of an example embodiment of the HID in accordance with one embodiment of the present invention.

A block diagram of an example embodiment of the HID is illustrated in FIG. 4. The components of the HID are coupled internally to a PCI bus 1412. Network control block 1402 communicates to the internal network, such as an Ethernet or intranet, through line 1414. An audio codec 1403 receives audio data on interface 1416 and is coupled to network control block 1402. USB data communication is provided on lines 1413 to a USB controller 1401. The HID further comprises an embedded processor 1404 such as a Sun Microsystems Sparc2ep with coupled flash memory 1405 and DRAM 1406. The USB controller 1401, the network control block 1402 and the embedded processor 1404 are all coupled to the PCI bus 1412. A video controller 1409, also coupled to the PCI bus 1412, can include an ATI RagePro+ frame buffer controller, which provides SVGA output on the line 1415. NTSC data is provided in and out of the video controller through video decoder 1410 and encoder 1411, respectively. A smartcard interface 1408 may also be coupled to the video controller 1409.

Figure 5:
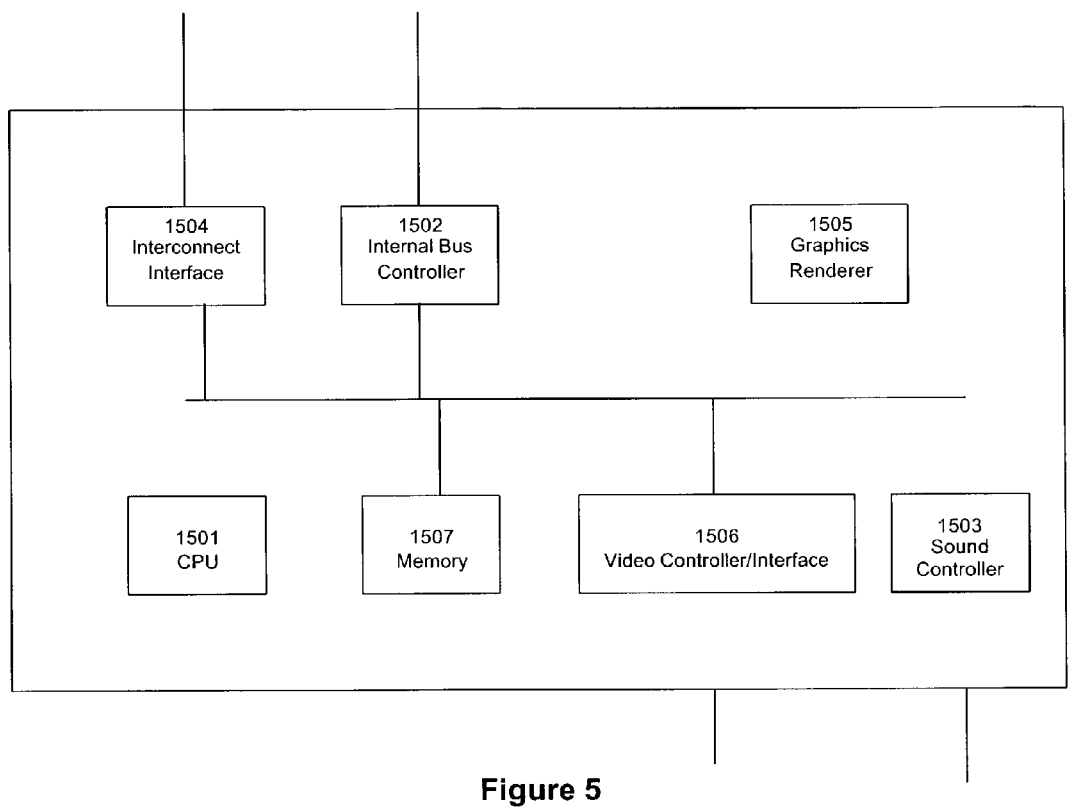
FIG. 5 is a block diagram of a single chip implementation of an HID in accordance with one embodiment of the present invention.

Alternatively, the HID can comprise a single chip implementation, as illustrated in FIG. 5. The single chip includes the necessary processing capability implemented via CPU 1501 and graphics renderer 1505. Chip memory 1507 is provided along with video controller/interface 1506. An internal bus (USB) controller 1502 is provided to permit communication to a mouse, a keyboard and other local devices attached to the HID. A sound controller 1503 and an interconnect interface 1504 are also provided. The video interface shares memory 1507 with the CPU 1501 and graphics renderer 1505. The software used in this embodiment may reside locally in on-volatile memory or it can be loaded through the interconnection interface when the device is powered.

Encapsulation of Internet Protocols

In some internal network computer systems (e.g., thin client architectures) much of a user's data and computation is maintained and performed at a remote location away from the client using a server. When all of the data or computation necessary for a user's task is handled by a server, the user may easily interact with the system at different locations with an enterprise using different clients via the internal network. However, some applications require or prefer some data or computation to be handled at the client. In either case, prior art methods require the use of a browser to act as an intermediary before applications stored on the local system (i.e., clients and/or servers within an enterprise) are able to access files not locally stored on the local system. The browser is able to locate and access files on the Internet by the use of Uniform (or previously Universal) Resource Locators (URL's). URL's are strings that specify the locations of objects (e.g., files) on the Internet. A URL can appear as a HTTP URL and/or a File Transfer Protocol (FTP) URL shown respectively below:

http://machine/path1/path2/document.ext
ftp://machine/path1/path2/document2.ext

The browser may also be configured to recognize common extensions (e.g., ".ext" or ".pdf") and to associate some applications stored on the local system to the common extensions.

Figure 6:
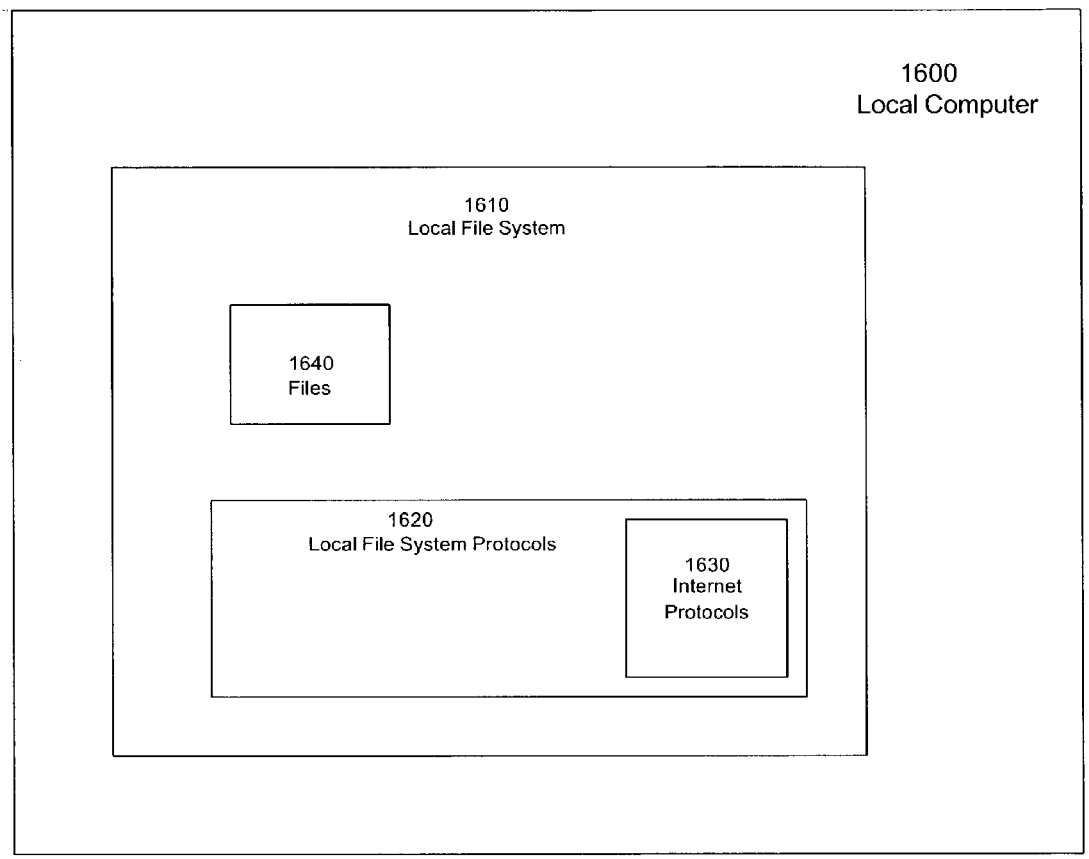
FIG. 6 is a block diagram of an integration architecture for encapsulating Internet protocols into a local computer in accordance with one embodiment of the present invention.

FIG. 6 illustrates one embodiment of the present invention. In FIG. 6, Internet protocols 1630 (e.g., HTTP, FTP, etc.) are encapsulated into the standard local file system protocols 1620 (e.g., a Uniform File System (UFS) protocol) of a local computer's file system 1610. This encapsulation of the Internet protocols 1620 allows the local file system 1610 to treat URL's (e.g., the HTTP and the FTP URL's shown above) as regular files 1640 stored in the local file system 1610. Thus, all web (or Internet) based documents (or files) under the encapsulated Internet protocols 1630 could now be accessed (without a browser) by applications on the local computer 1600 as if these Internet (or web) documents (or files) are stored on the local file system 1610 of the local computer 1600.

Figure 9:
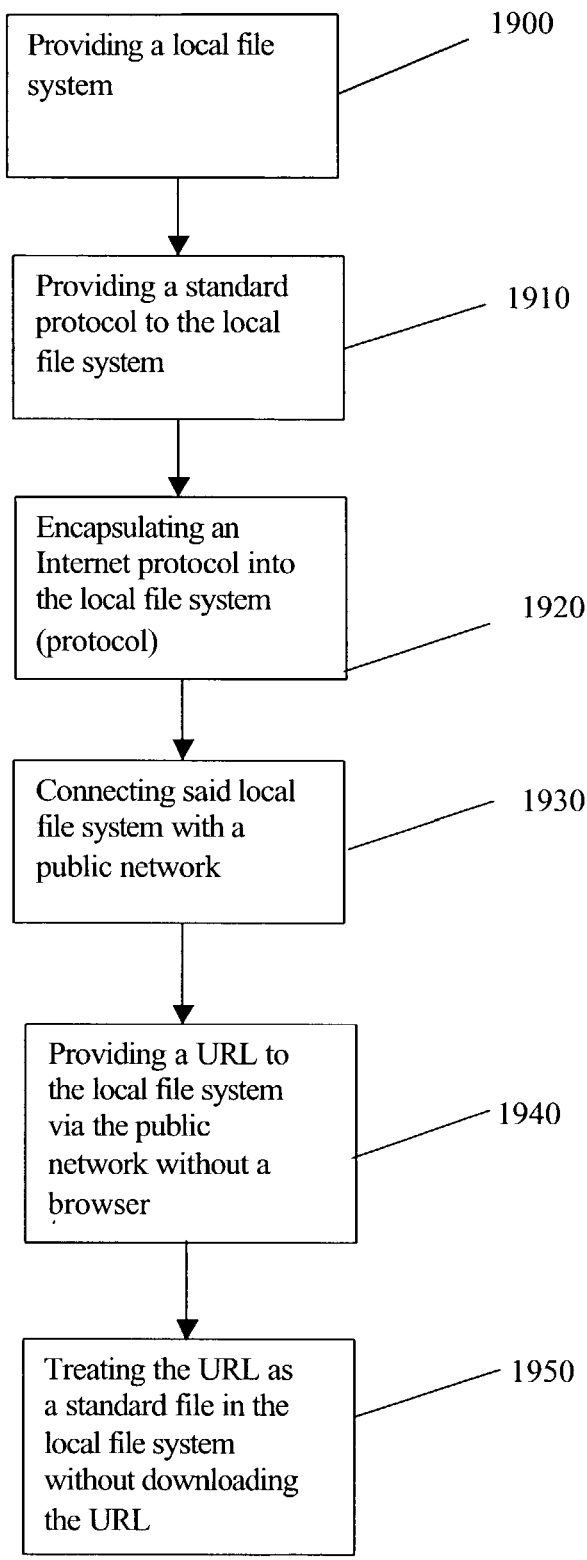
FIG. 9 is an example flowchart on a logical flow of the computer system in FIG. 6 in accordance with one embodiment of the present invention.

Referring now to the example flowchart shown in FIG. 9, a local file system 1610 is provided to the local computer 1600 (step 1900). A standard file system protocol or protocols 1620 are then provided to the local file system 1610 (step 1910). An Internet protocol or protocols 1630 are then encapsulated into the file system 1610 (e.g., into the standard file system protocol(s) 1620) (step 1920). The local file system 1610 is then connected with a public network (e.g., the Internet or the Web) step 1930). A URL or URL's are then provided to the local file system 1610 via the public network without the use of a browser (step 1940). The URL or URL's are then treated by the local file system 1610 as a standard file or files 1640 in the local file system 1610, even though the URL or URL's have not been downloaded into the persistence storage of the local file system 1610 (step 1950).

Figure 7:
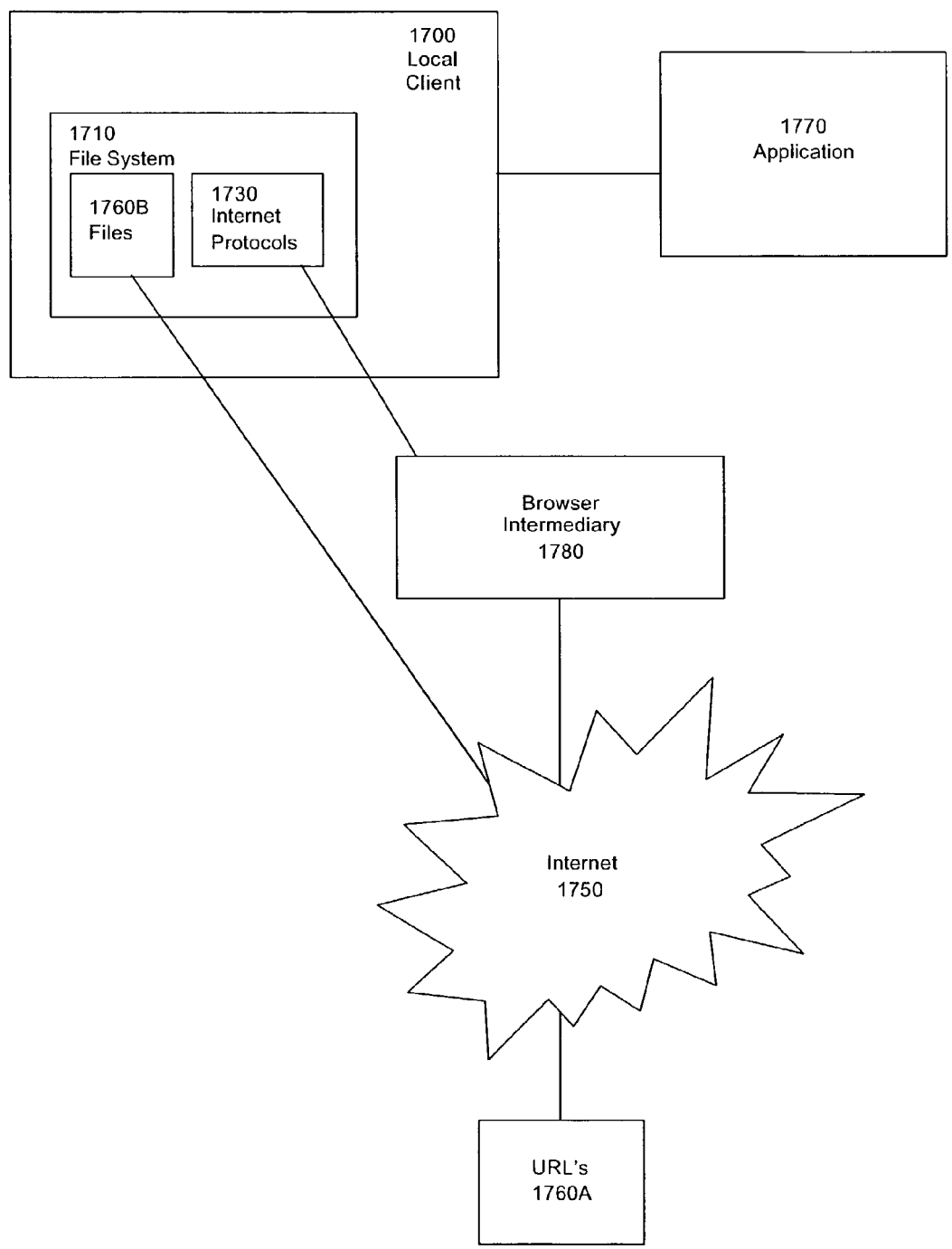
FIG. 7 is a block diagram of an integration architecture for encapsulating Internet protocols into a local client in accordance with one embodiment of the present invention.

In another embodiment (referring now to FIG. 7), a file system 1710 of a local client 1700 is encapsulated with Internet protocols 1730 (e.g., HTTP or FTP). This encapsulation allows URL's 1750A on the Internet (under the encapsulated Internet protocols) to be treated as if they are regular files 1750B stored in the client 1700. Thus, files 1760A on the Internet 1750 (and away from the client 1700) can now be accessed by an application 1770 on the client 1700 without using the browser 1780 as an intermediary.

Figure 8:
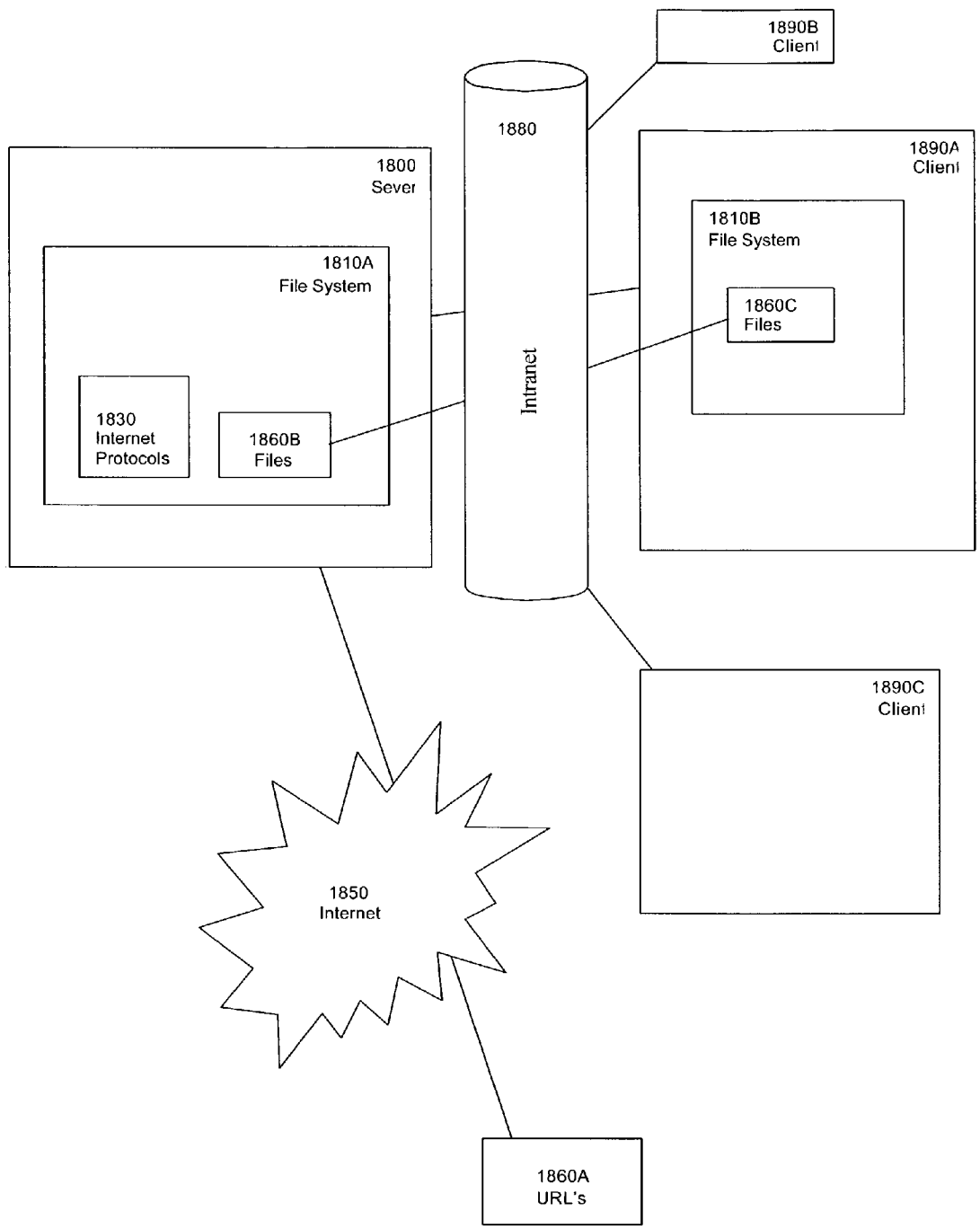
FIG. 8 is a block diagram of an integration architecture for encapsulating Internet protocols into a local server in accordance with one embodiment of the present invention.

In a further embodiment (referring now to FIG. 8), Internet protocols 1830 are encapsulated into the file system 1810A (e.g., a network file system—NFS) of a server 1800 within an intranet 1880. The encapsulated file system 1810A is now called the Web Filesystem. Once the server's file system 1810A has been encapsulated and becomes the Web Filesystem, files 1860A on the Internet 1850 (such as "http:" or "ftp:" files) could be accessed by the server 1800 as if they were local 1860B to the server 1800. In yet a further embodiment, the server 1800 is configured to export files (e.g., 1860B) in its Web Filesystem 1810A to a plurality of clients (1890A, 1890B, and 1890C) via the intranet 1880. Each of the clients (e.g., client 1890A) is configured to treat the files (e.g., 1860B) in the Web Filesystem 1810A as if the files (e.g. 1860A) are in the local file system 1810B for that client (e.g., 1890A). Because the files (e.g., files 1860B) are shared by the clients (1890A, 1890B, and 1890C) through intranet 1880 using NFS protocols (such as tcp/ip or UDP), the files (e.g., files 1860B and 1860C) are secured from the destructive forces outside the intranet 1880. Accordingly, for example, a HTTP URL (e.g., a file in 1860A):

http://www.web.com/path1/path2/document.ext would become accessible with local semantic by mounting the Internet protocol (e.g., HTTP) on some installation defined directory (i.e., "/" or "/dir1/mount" in the Web Filesystem), for example, as:

/http://www.web.com/path1/path2/document.ext
or
/dir1/mount/http://www.web.com/path1/path2/document-.ext The HTTP URL would now behave as if it was a file (e.g., a file in 1860B) on the file system 1810A (i.e., the Web Filesystem) of the server 1800. Any client (e.g., 1890A) connected with the server 1800 via the intranet 1880 could access the above URL through the server 1800 as if it was local (e.g., a file in 1860C) to the client (e.g., 1890A). Such a file (e.g., a file in 1860) may be read only (like the files on the Internet as viewed by a browser) or could allow for certain modifications, such as modifications to its content and/or how it is organized within the Web Filesystem 1810.

In one embodiment, the server comprises a Web Filesystem (Webfs) server so that the local Operating Environment of each of the clients connected with the Webfs server becomes a Webfs client for receiving services from Webfs server. The services include allowing the user to access the files on the Web Filesystem as if the files were local to the Webfs client. In a further embodiment, a caching mechanism is implemented on the Webfs client.

Figure 10:
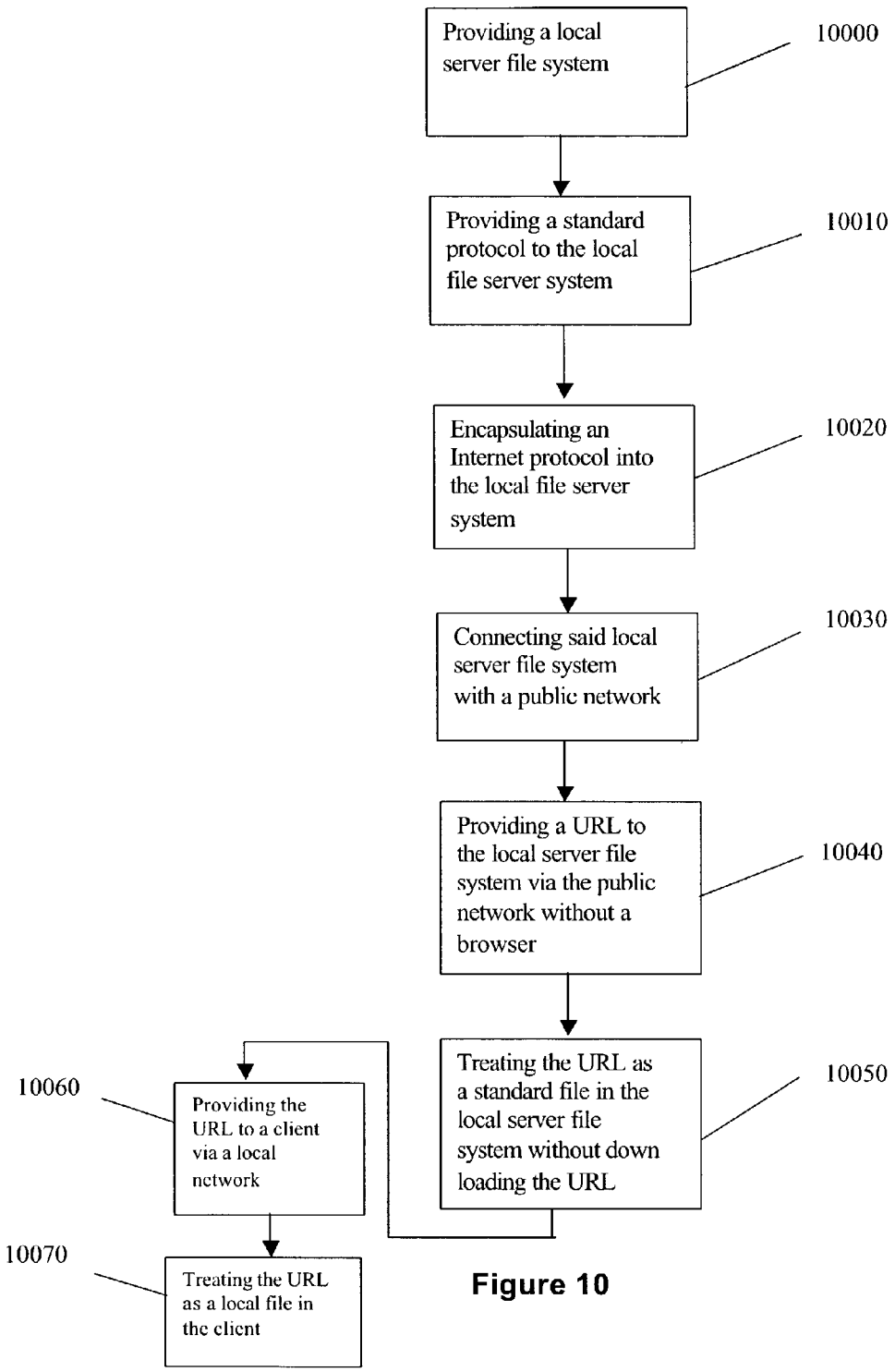
FIG. 10 is an example flowchart on a logical flow of the computer system in FIG. 8 in accordance with one embodiment of the present invention.

Referring now to the example flowchart shown in FIG. 10, a local server file system 1810A is provided to the local server 1800 (step 10000). A standard file system protocol or protocols are then provided to the local server file system 1810A (step 10010). An Internet protocol or protocols are then encapsulated into the server file system 1810A (e.g., into the standard file system protocol(s)) (step 10020). The local server file system 1810A is then connected with a public network 1850 (e.g., the Internet or the Web) step 10030). A URL or URL's 1860A are then provided to the local server file system 1810A via the public network 1850 without the use of a browser (step 10040). The URL or URL's 1860A are then treated by the local server file system 1810A as a standard file or files 1860B in the local server file system 1810A, even though the URL or URL's 1860A have not been downloaded into the persistence storage of the local server 1800 (step 10050). The local server 1800 is then connected with a client 1810B via a local network 1880 (e.g., the intranet). The URL or URL's 1860A are then provided to the client 1810B via the local network 1880 (step 10060). The URL or URL's 1860A are then treated as a local file or files 1860C of the client 1860B (step 10070).

Directory and Listing of File System

When Internet files are made accessible by the local machine, the notion of directory and listing on the local machine needs to be developed. In one embodiment of the present invention, tree structures of a directory and files are developed. Tree structures are necessary to allow applications (or users) on the local machine to locate a directory and to list the files and subdirectories therein.

Typically, URL's on the Internet has an organized directory structure, but this structure often does not have a listing capability (i.e., it cannot list files and subdirectories under the main directory). Thus, a user (or an application) on the local machine cannot use the directory structure on the Internet to determine which files and sub-directory exits below the main directory. In one embodiment of the present invention, a Webfs locator (or relator) in the local machine is developed and used to relate an application (or a user) on the local machine to its corresponding file on the Webfs.

Figure 11:
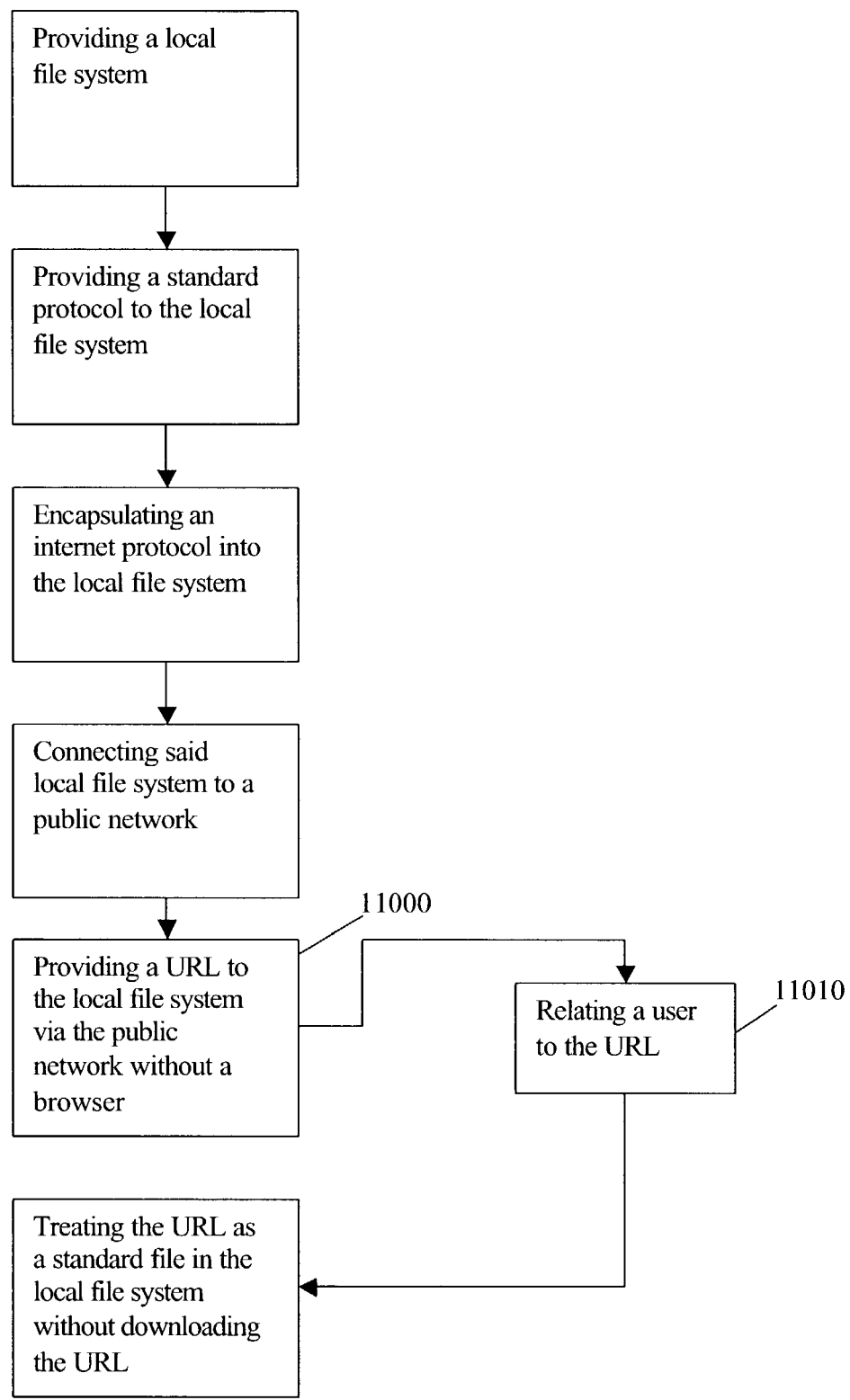
FIG. 11 is an example flowchart of a relating step in accordance with one embodiment of the present invention.

Thus, according to the example flowchart shown in FIG. 11 (which is similar to the examples shown in FIGS. 9 and/or 10, with the addition that) a user is related to its corresponding URL or URL's (in step 11010) after the URL or URL's have been provided to the local file system (in step 11000).

Figure 12:
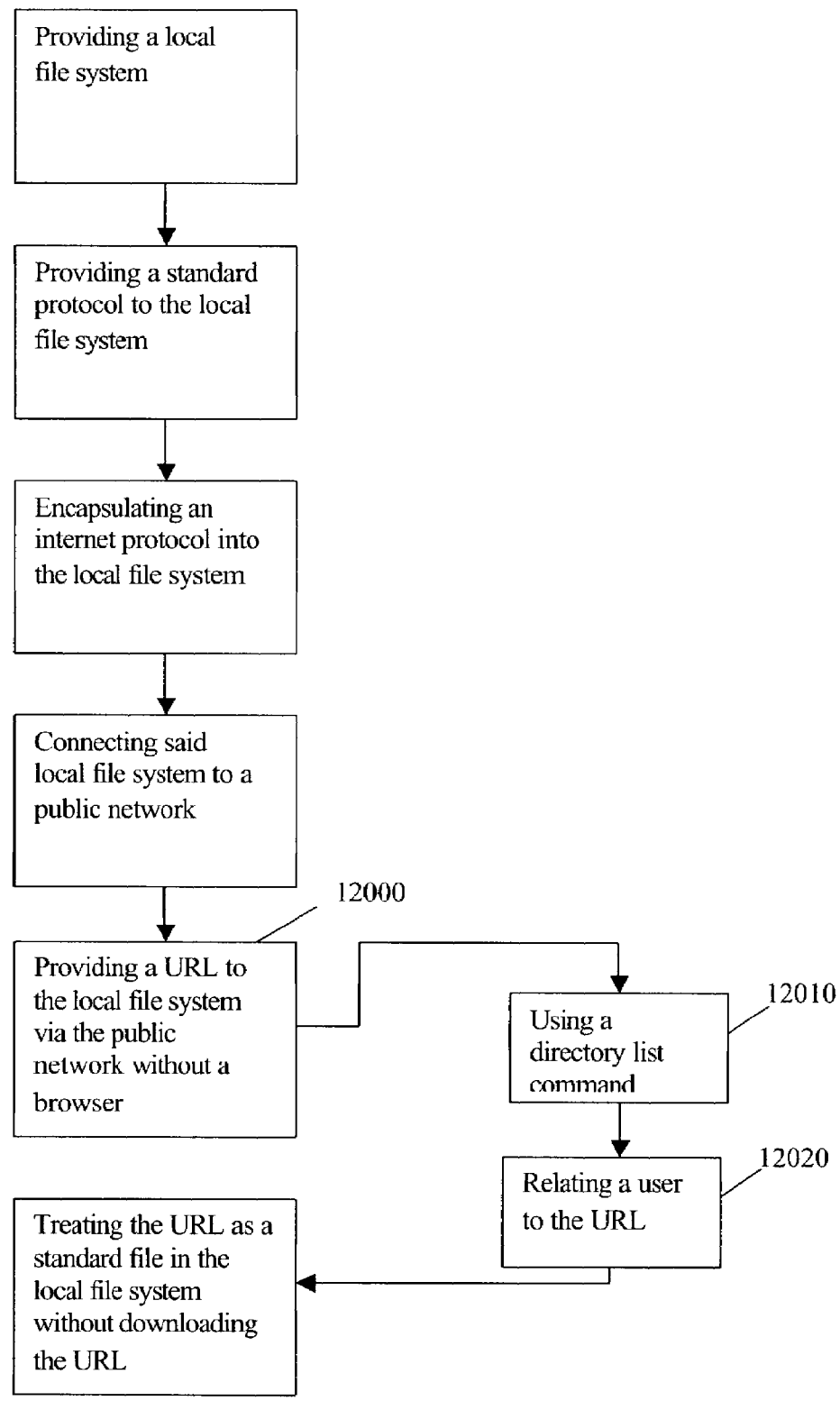
FIG. 12 is an example flowchart of another relating step in accordance with one embodiment of the present invention.

In one embodiment, when a file is accessed on the Internet following a user operation, the caching mechanism (implemented) on a Webfs client will put that file into its local caching (non-persistent) memory. This causes some portion of the Internet (the file(s) recently accessed) to have a local existence. The local computer standard directory listing command ("ls") could then be used to view Internet (or web) file (or document) that has this local existence. Accordingly, the local caching mechanism will have a directory structure that maps to the Internet (web) in a way that is meaningful to users. Thus, according to the example flowchart shown in FIG. 12 (which is similar to the chart shown in FIG. 11, with the addition that) a directory list command is used (in step 12010) to relate a user to its corresponding URL or URL's (in step 12020) after the URL('s) have been provided to the local file system (in step 12000).

In yet a further embodiment, the caching mechanism comprises a webfscache. All Internet files retrieved by a user are first placed into the webfscache and tagged with that user's identification (e.g, user id or UserA or uid1). The webfscache has a directory structure that is closely matched with the local file system (e.g., the Webfs in the Webfs server). The webfscache may also comprise bookkeeping information (such as how long a locally cached copy of the Internet based file is valid, how long a locally cached copy is to be kept, etc.).

The user (User A or uid1) is only shown the files available on the Web Filesystem (Webfs) and is not aware if any of such files has been cached. User A can browse Webfs to look for files on the Internet (URL's) already accessed before. When the user (e.g., User A) wants to use a file that has been cached, it (e.g., User A) uses the file as if it was a local file. In another embodiment, a second user (e.g., User B or umd2) on a second Webfs client is also connected to the Webfs server. If that second user (e.g., User B) wants to access the same file, then both users (e.g., User A and User B) will share the cached file copy, but the Webfs server will not make the sharing apparent (except that the second user, using the cached copy of the first user, will see a faster response). In yet another embodiment, the cached files are stored in a read only Webfs.

A typical user session (having a list command ("ls") that relates a cached file) is shown below:

```
$ cd /
$ ls www.sun.com
$       ("ls" cannot relate to the file in "www.sun.com" because it has not
        been cached)
$ wc www.sun.com/awebdocument (the file is accessed on the Webfs by
    a command)
$ "www.sun.com/awebdocument" (this is the command output)
$ ls www.sun.com (user runs "ls" again)
$ "www.sun.com/awebdocument" (document now exits and is related)
```

Thus, a file can be accessed within a local cache mechanism of the local machine after a user has first accessed it on the Internet.

In a further embodiment, the above session can be carried out in a graphical user interface (GUI) based environment. For example, instead of using the above "wc" and command line operations, the present embodiment may allow a user to select or "pull down" a menu on a terminal screen of the machine. Upon selection, the menu provides the user with an accessing dialog box, wherein the user can type the name or path of a Internet file to be accessed.

Figure 13:
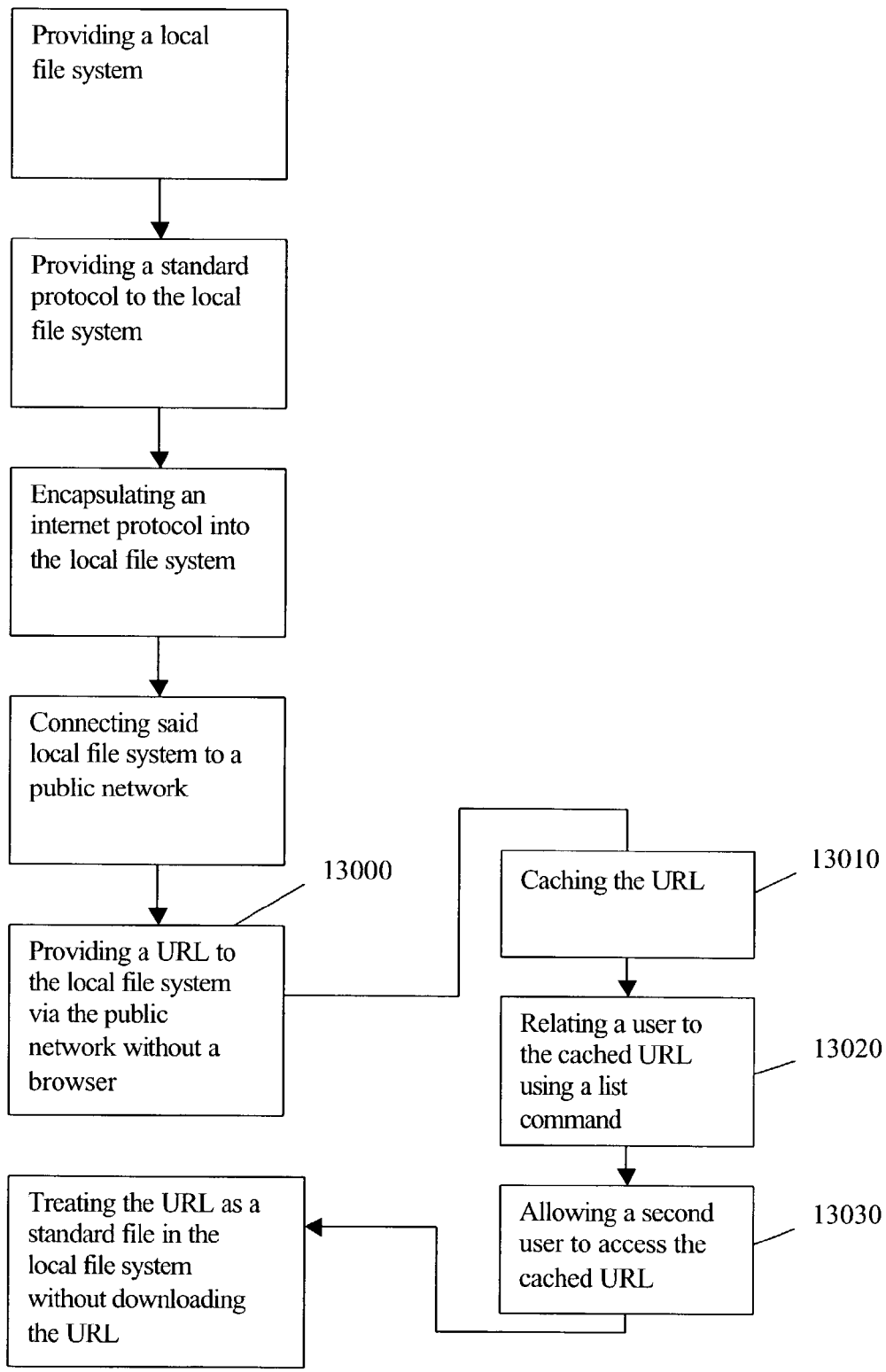
FIG. 13 is an example flowchart of a caching step in accordance with one embodiment of the present invention.

Accordingly, in the example flowchart shown in FIG. 13 (which is similar to the chart shown in FIG. 12 with the addition that), a URL or URL's are cached (in 13010) after the URL('s) have been provided to the local file system (in step 13000). The cached URL('s) are then related to a corresponding user using a list command "ls" (in step 13020). In addition, once the URL('s) have been cached, a second user is allowed access to the cached URL or URL's (in step 13030).

In another embodiment, the confidentiality between users of the Webfs should be maintained. For example, if UserA wants to access a file that he already accessed before by a Webfs command, such as a "wc" command, the file can be shown to UserA following a "ls" command (executed by User A). However, if UserB uses an "ls" command on the same directory, UserB would not see the file. However, if UserB tries to access the same file by executing a "wc" command or any other command, then the cached copy is provided to userB by the caching mechanism.

In one embodiment, the confidentiality function can be implemented by storing or caching files under a local file system structure (such as /tmp/webcache). When a file (such as www.sun.com/awebdocument) is accessed by a user (e.g., uid1), Webfs would retrieve all or a portion of the file from the Internet, and would place a local copy of the file into a location (such as /tmp/webcache) hidden from all users. For example the file (www.sun.com/awebdocument) can be placed in the hidden location as shown below:

/tmp/webcache/www.sun.com/awebdocument.uid1

The above "uid1" extension identifies the user that accessed the file. If a new user (uid2) later wants access to the same file, Webfs would create a hard link called:

/tmp/webcache/www.sun.com/awebdocument.uid2

This link points the second user (e.g., uid2) to the file (or document) retrieved by the first user (i.e., the user identified as uid1). Each user can now access the same file without knowing about the other's activity. Accordingly, this embodiment allows users of the Webfs to share cached files in a confidential manner.

Figure 14:
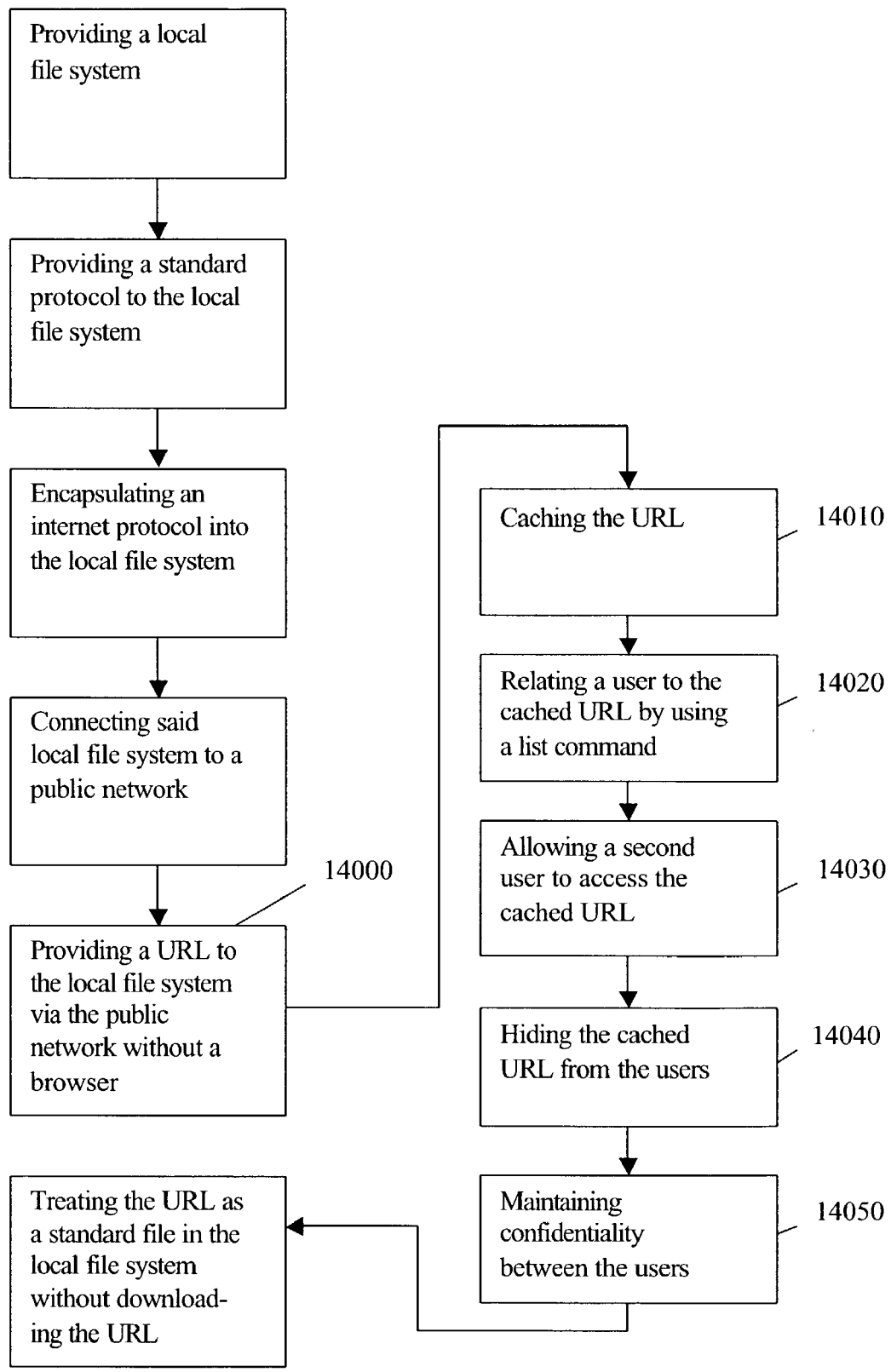
FIG. 14 is an example flowchart of another caching step in accordance with one embodiment of the present invention.

Accordingly, in the example flowchart shown in FIG. 14 (which is similar to the chart shown in FIG. 13 with the addition that), a URL or URL's are cached (in 14010) after the URL('s) have been provided to the local file system (in step 14000). The cached URL('s) are then related to a corresponding user using a list command "is" (in step 14020). In addition, once the URL('s) have been cached, a second user is allowed access to the cached URL or URL's (in step 14030). However, the actual location of the cached URL('s) are hidden from both users (in Step 14040). Thus, the confidentiality between the users is maintained because the users will not know where the URL('s) are from and that the URL('s) are being shared (in step 14050).

Having thus described embodiments of the present invention, it should be apparent to those skilled in the art that certain advantages of the within system have been achieved. It should also be appreciated that various modifications, adaptations, and alternative embodiments thereof may be made within the scope and spirit of the present invention. For example, the file systems on a server connected with a client via an intranet have been illustrated, but it should be apparent that the inventive concepts described above would be equally applicable to other types of network systems. The invention is further supported by the following examples.

The invention claimed is:

1. A computer system, comprising:
   a processor;
   a memory including persistent storage;
   a network interface;
   wherein the memory stores program instructions executable by the processor to implement a file system that is configured to access, via the network interface, a remote file located on a remote computer system that is coupled to a public network, wherein the remote file is specified by a Uniform Resource Locator (URL), and wherein the file system is integrated with an Internet communication protocol in a manner that permits the file system to use the Internet communication protocol to access the remote file;
   wherein the file system is configured to permit an application program stored on the computer system to make a request to access the remote file via the files system, wherein the request uses semantics associated with the file system, wherein the request includes the URL, and wherein the application program is not a browser;
   wherein the file system, in response to the request, is configured to provide the application program access to the remote file without the remote computer system having to execute code corresponding to the file system and without the computer system downloading the remote file into persistent storage.

2. The computer system of claim 1, wherein said remote computer system is configured to receive said file system's request for said remote file via the Internet, and wherein said received request for said remote file is in a format specified by said Internet communication protocol.

3. The computer system of claim 2, wherein said Internet communication protocol is Hyper Text Transport Protocol (HTTP) or File Transfer Protocol (FTP).

4. The computer system of claim 1, wherein said remote computer system is a Web Filesystem (Webfs) server.

5. The computer system of claim 4, wherein said computer system is a Webfs client configured to receive services from said Webfs server.

6. The computer system of claim 1, wherein said computer system further comprises non-persistent storage, and wherein said file system, in response to accessing said remote file, is configured to cache said remote file in said non-persistent storage.

7. The computer system of claim 6, wherein said computer system is configured to execute a directory command that provides information corresponding to said cached remote file.

8. A computer-implemented method of using a computer system to access a remote file identified by a Uniform Resource Locator (URL), the method comprising:
- a file system receiving, from a application program on the computer system, a request to access the remote file located on a server coupled to a public network, wherein the file system is integrated with an Internet communication protocol in a manner that permits the file system to use the integrated communication protocol to access the remote file, and wherein the request for the remote file uses semantics associated with the file system and includes the URL;
- the file system transmitting the request for the remote file to the server via a network interface of the computer system,
- the file system receiving a response to the request for the remote file, wherein the response is received from the server; and
- the file system providing the application program access to the remote file without the server having to execute code corresponding to the file system and without downloading the remote file into persistent storage of the computer system;
- wherein the application program is not a browser.

9. The computer-implemented method of claim 8, wherein said Internet communication protocol is Hyper Text Transport Protocol (HTTP) or File Transfer Protocol (FTP).

10. The computer-implemented method of claim 8, wherein said computer system includes non-persistent storage, and wherein said method further comprises caching accessed remote file in said non-persistent storage.

11. The method of claim 10, further including providing directory information corresponding to said cached remote file in response to said computer system receiving a directory command.

* * * * *